March 23, 1926.
S. ABBOTT
FLYTRAP FOR STOCK
Filed Feb. 29, 1924
1,577,435
2 Sheets-Sheet 1
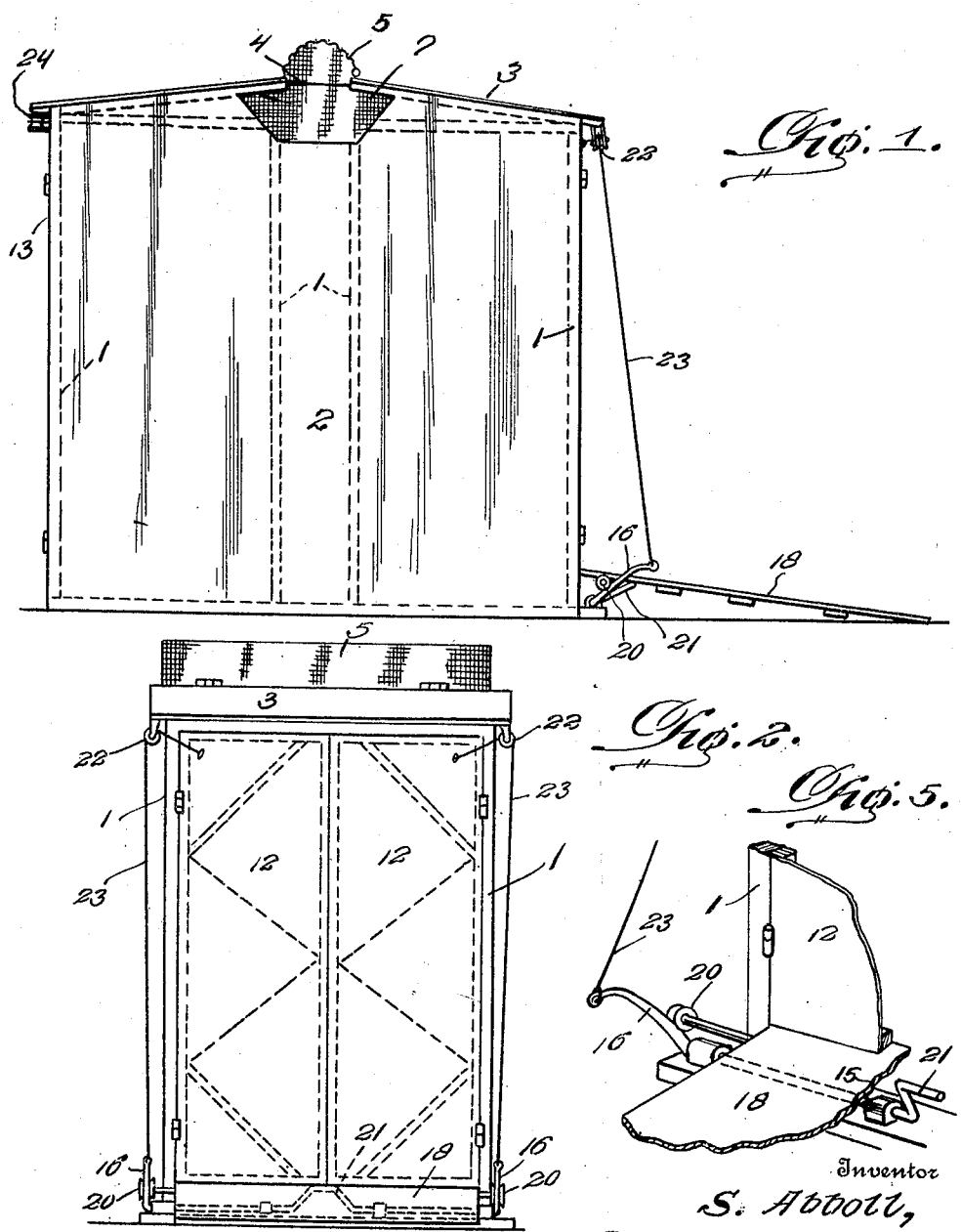

March 23, 1926.  1,577,435
S. ABBOTT
FLYTRAP FOR STOCK
Filed Feb. 29, 1924  2 Sheets-Sheet 2
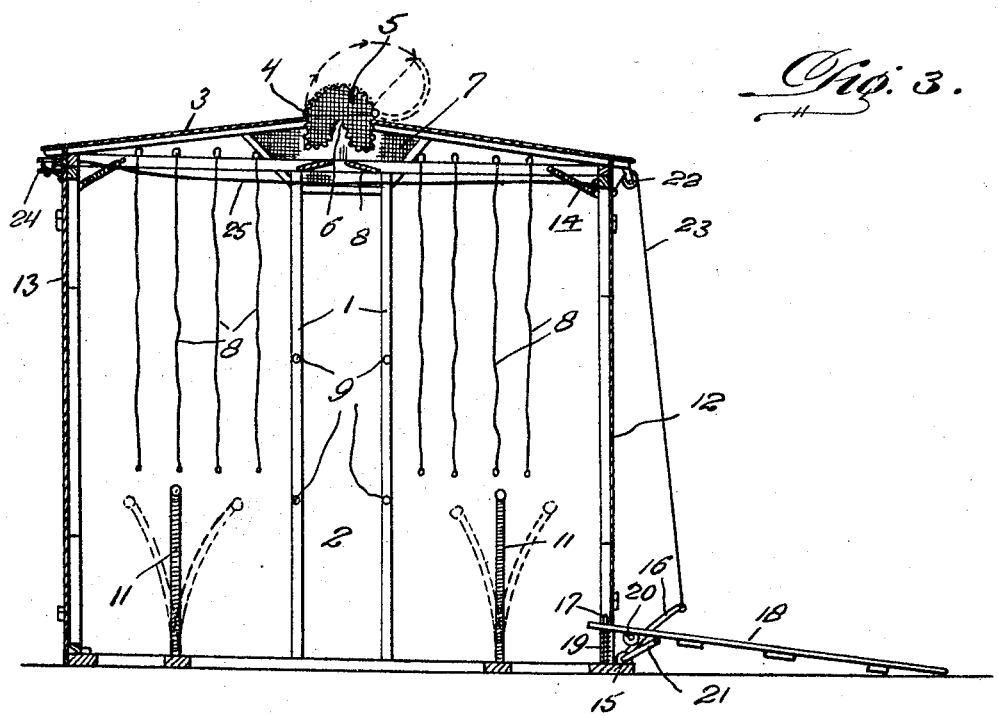
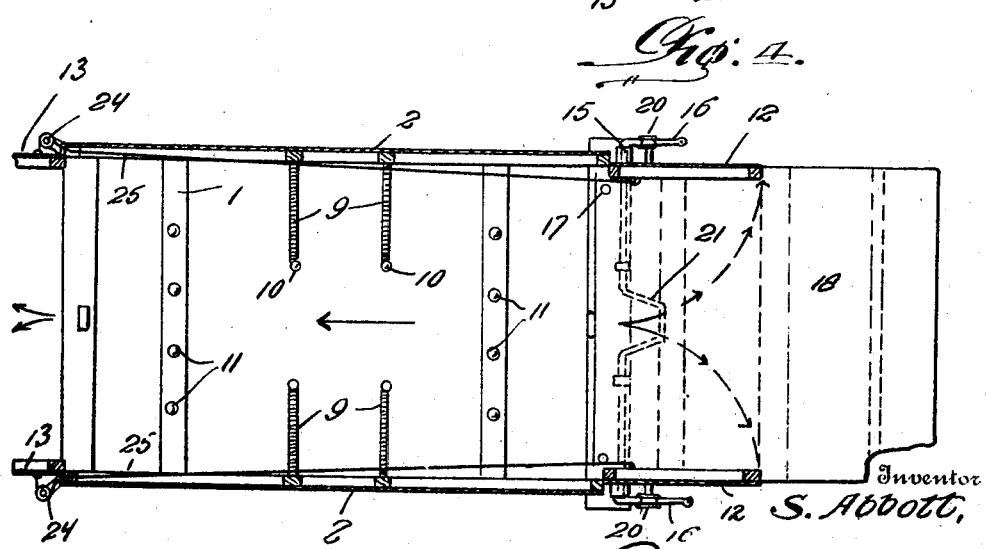

Patented Mar. 23, 1926.

1,577,435

UNITED STATES PATENT OFFICE.

SELMON ABBOTT, OF TAYLORVILLE, ILLINOIS.

FLYTRAP FOR STOCK.

Application filed February 29, 1924. Serial No. 695,958.

*To all whom it may concern:*

Be it known that SELMON ABBOTT, a citizen of the United States, residing at Taylorville, in the county of Christian and State of Illinois, has invented certain new and useful Improvements in Flytraps for Stock, of which the following is a specification.

This invention relates to structures or devices adapted to be used for removing flies from the bodies of stock cattle and it consists in the novel features hereinafter described and claimed.

An object of the invention is to provide a structure having at opposite sides, hinged doors which normally remain closed over their openings, the said doors being operatively connected together whereby they simultaneously swing to open position. A platform operated mechanism is provided for swinging the doors from closed to open position when the cattle step upon the platform. Means are provided within the structure for knocking or brushing the flies or insects from the cattle as they pass through the structure and a trap is mounted at the center of the roof of the structure and is adapted to receive and empound the flies and insects removed from the cattle.

In the accompanying drawings:—

Figure 1 is a side elevation of the fly trap structure.

Figure 2 is an end elevation of the same.

Figure 3 is a vertical longitudinal sectional view of the same.

Figure 4 is a horizontal sectional view of the same.

Figure 5 is a fragmentary detailed perspective view of means provided for swinging the doors of the trap structure.

The trap structure comprises a frame 1 which is preferably rectangular in form. Side panels 2 are applied to the frame 1 and the space between the side panels constitute a passageway for the cattle or stock through the frame and trap structure. A roof 3 is mounted upon the frame 1. A trap body 4 is mounted at the intermediate portion of the roof 3 and extends transversely thereof. The said trap body is provided with a hinged, dome-shaped foraminous top member 5. The bottom of the trap body 4 is provided with an opening 6 through which the flies may enter the body 4 in a usual manner. Ventilating screens 7 are located in the side panels 2 just under the roof 3.

Strips 8 extend transversely across the upper portion of the frame 1 and are spaced from each other at their inner edges. The said strips 8 are upwardly and inwardly inclined toward each other and the space between the inner edges of the said strips is located directly below the openings 6 in the body of the trap 4, therefore the strips 8 cut off the rays of light from above and they serve as means for directing the flies and insects in an upward direction toward the openings 6 in the trap. The space between the inner edges of the strips permits the rays of light to pass through the openings at the top of the roof and down into the body of the structure of which the frame 1 and side panels 2 are component parts. When the flies or insects have been brushed or knocked from the animal, as hereinafter explained, they will be attracted by these rays of light and will ascend and be directed by the strips 8 through the space between their inner edges, and up toward the openings 6 in the bottom of the body 4 of the trap. Therefore these open spaces serve as light openings and the light at these openings will serve as a lure for attracting and directing the flies and insects into the body of the trap. Spaced strips of flexible netting 8 hang pendent from the upper portion of the frame 1 and are disposed transversely across the interior of the frame. Horizontal springs 9 are secured at their ends to the side pieces of the frame 1 and are disposed inwardly toward each other. The springs 9 are provided at their inner ends with knobs 10. Similar springs 11 are mounted upon the lower portion of the frame 1 and are vertically disposed. The springs 11 also carry knobs at their free ends.

Doors 12 are hinged at one end of the frame 1 and doors 13 are hinged at the opposite end of the said frame. Means are provided for simultaneously swinging the doors at the opposite ends of the frame to open position and other means are provided for simultaneously closing the said doors. A spring 14 is connected at its outer end to each of the door panels 12 and 13 and the inner ends of all of the springs are secured to the frame 1. When the doors are swung to open position, these springs are stretched, and after they have been released, the springs 14 contract and all of the door panels close simultaneously. A shaft 15 is journalled transversely at the lower portion of the frame 1 and at one end thereof and is disposed across the frame. The shaft 15 is located adjacent the lower edges of the door panels 12. The shaft 15 is provided at its ends with crank arms 16. Vertically disposed pins 17 are mounted upon the frame 1 adjacent the shaft 15. A platform 18 is disposed in an inclined position at the end of the frame 1 and its upper portion is slidably mounted upon the pins 17. Springs 19 are mounted upon the pins 17 and serve to resiliently hold the inner edge portion of the platform 18 elevated and in a spaced relation with respect to the bottom of the frame 1. The platform 18 is provided at its side edges with journalled rollers 20 adapted to travel upon the upper edges of the crank arms 16. The shaft 15 is provided at a point between its ends with a crank portion 21 which bears against the under surface of the platform 18 and at a point between the end edges thereof. Pulleys 22 are journalled at the outer edges of the roof 3 and cables 23 are connected at one end with the free ends of the crank arms 16. The intermediate portions of the cables 23 are trained over the pulleys 22 and the other ends of the cables 23 are secured to the door panels 12. Pulleys 24 are journalled upon the frame 1 adjacent the door panels 13. Cables 25 are connected at one end with the door panels 13 and the intermediate portions of the cables 25 are trained around the pulleys 24. The opposite ends of the cables 25 are connected with the intermediate portions of the door panels 12.

The operation of the trap is as follows. Assuming that the door panels 12 and 13 are in the closed positions as shown in Figure 3. An animal steps upon the platform 18 and depresses the inner edge portion thereof against the tension of the springs 19. The rollers 20 move downwardly along the crank arms 16 and the crank 21 of the shaft 15 is turned about the axis of the said shaft. Therefore the shaft 15 is partially rotated and as the crank arms 16 move downwardly, the cables 23 are moved longitudinally whereby the door panels 12 are swung from closed to open position as shown in Figure 4 of the drawing, and the springs 14 are stretched. At the same time, the cables 25 are moved longitudinally and the door panels 13 are swung from closed to open position as indicated in Figure 4 of the drawing. Thus an open passageway is established through the trap structure from the platform 18 and the animal is forced or voluntarily moved from the platform 18 into the frame 1. As soon as the weight of the animal is removed from the platform 18, the tension of the springs 19 comes into play and the inner edge portion of the platform 18 is raised. At the same time, the springs 14 contract and all of the door panels 12 and 13 swing to closed position and while the animal is within the trap structure. When the door panels 12 swing to closed position, the cable sections 23 are moved longitudinally whereby the outer ends of the crank arms 16 are elevated to the position as shown in Figure 3 of the drawing. When the animal enters the interior of the frame 1, its body comes in contact with the springs 11, springs 9 and the knobs 10 thereon and the strips 8 scrape along the back of the animal's body. In that the animal moves between these flexible and resilient elements, the flies and insects upon the body of the animal are disturbed and in that the interior of the trap is darkened, with the exception of the rays of light penetrating the roof thereof, the flies and insects when they leave the animal's body are attracted upwardly toward the rays of light entering the trap through the roof.

The flies and insects are lured by the rays of light as hereinbefore described, and move in an upward direction toward the body 4 of the trap. The flies and insects in their effort to escape from the structure, pass through the openings 6 and enter the body 4 of the trap where they are confined and empounded.

When the next animal steps upon the platform 18, the preceding animal which in the meantime has been housed within the trap structure, may pass out of the structure through the opening which is uncovered by the swinging of the door panels 13 and thus as one animal leaves the structure, another animal may enter and the operation as above described is repeated.

Having thus described the invention, what is claimed is:

In a trap structure, a frame, door panels hingedly mounted upon the frame, pins mounted upon the frame, a platform slidably mounted upon the pins, springs interposed between the platform and the frame, a shaft journalled upon the frame and provided at its ends with crank arms and having an intermediate crank arm engageable with the intermediate portion of the platform, rollers carried by the platform and adapted to travel along the first mentioned crank arms, pulleys journalled at the upper portion of the frame, and cables connected at one end to the free ends of the crank arms and trained over the pulleys, and connected at their other ends with the door panels at intermediate points thereof.

In testimony whereof I affix my signature.

SELMON ABBOTT.